United States Patent [19]

Kennedy

[11] Patent Number: 4,947,050
[45] Date of Patent: Aug. 7, 1990

[54] SENSOR BRACKET FOR MAGNETIC TAPE CARTRIDGE DRIVE

[75] Inventor: Michael J. Kennedy, Los Gatos, Calif.

[73] Assignee: Qincar Corporation, San Jose, Calif.

[21] Appl. No.: 379,241

[22] Filed: Jul. 11, 1989

[51] Int. Cl.⁵ .............................................. G06K 7/10
[52] U.S. Cl. ..................................... 250/570; 250/239
[58] Field of Search .................. 250/239, 570; 353/25; 360/96.5

[56] References Cited

U.S. PATENT DOCUMENTS

| | | | |
|---|---|---|---|
| 4,338,519 | 7/1982 | Horste et al. | 250/239 |
| 4,622,461 | 11/1986 | Taillebois | 250/239 |
| 4,644,158 | 2/1987 | Taillebois | 250/239 |
| 4,796,120 | 1/1989 | Komatsu et al. | 360/96.5 |

Primary Examiner—David C. Nelms
Assistant Examiner—Stephone B. Allen
Attorney, Agent, or Firm—Fliesler, Dubb, Meyer & Lovejoy

[57] ABSTRACT

A U-shaped sensor bracket for use in a magnetic tape cartridge drive is provided with resilient retaining members for holding sensors used in detecting end and beginning of tape holes in a tape and for sensing the condition of write protect apparatus in a tape cartridge.

3 Claims, 4 Drawing Sheets

4,947,050

SENSOR BRACKET FOR MAGNETIC TAPE CARTRIDGE DRIVE

BACKGROUND OF THE INVENTION

1. Field of the Invention

The present invention relates to magnetic tape cartridge drives in general and in particular to an improved sensor bracket for mounting sensors in a drive which are used for detecting tape position and the status of a write protection device in a cartridge inserted in the drive.

2. Description of the Prior Art

Magnetic tape in a cartridge of the type to which the present invention is related is typically provided with holes located at predetermined positions near the opposite ends thereof. In practice, the holes are sensed by sensors responsive to light from light-emitting diodes for generating beginning-of-tape and end-of-tape signals.

Such cartridges also comprise a write protection device. The write protection device typically comprises a cavity and a door of some sort which is used by an operator to open and close the cavity. The open and closed status of the cavity is sensed by a sensor also responsive to light from a light-emitting diode when the cartridge is inserted in the drive. This sensor is provided for generating a signal to control writing circuits in the drive or host computer to which the drive is coupled such that the writing circuits are enabled or disabled depending on whether the cavity is opened or closed.

In prior known tape cartridge drives, the above-described sensors have been mounted in the drives in various ways. However, the methods and means typically used have generally involved permanent installations and as a result have been costly and time consuming particularly when it becomes necessary to repair or replace a sensor or light-emitting diode.

SUMMARY OF THE INVENTION

In view of the foregoing, a principal object of the present invention is an improved sensor bracket for use in a magnetic tape cartridge drive. In the bracket detents and resilient cantilevered members are used for releasably holding sensors comprising photocells and light-emitting diodes in predetermined positions.

The construction of the bracket is such that the individual photocells and light-emitting diodes are easily assembled and the bracket can be quickly installed in a tape drive. As a consequence, the cost and time required to construct the drive and to repair or replace sensor components therein are reduced.

BRIEF DESCRIPTION OF THE DRAWINGS

The above and other objects, features and advantages of the present invention will become apparent from the following detailed description of the accompanying drawing, in which.

DETAILED DESCRIPTION OF THE DRAWINGS

Figure 1:
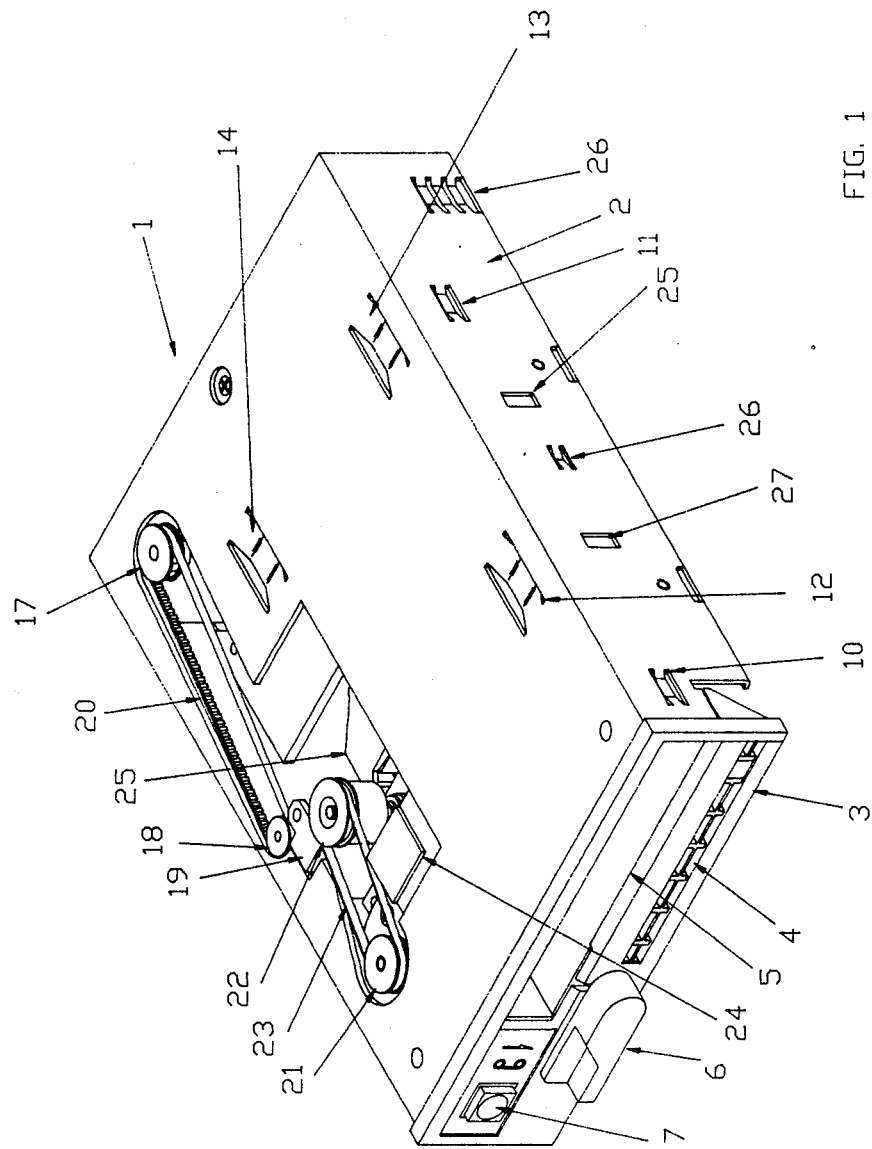
FIG. 1 is a perspective view of a magnetic tape cartridge drive according to the present invention.

Referring to FIG. 1, there is provided a magnetic tape drive designated generally as 1. In the drive 1 there is provided a frame 2. At the front end of the frame 2 there is provided a front panel 3. Located in the panel 3 there is provided a plurality of cooling vents 4, an opening 5 through which a magnetic tape cartridge is inserted and removed from the drive 1, a front bezel lever 6 and a control button 7. Lever 6 is used for loading and unloading the tape cartridge and button 7 is used for removing the head from the tape before the lever 6 is activated.

Extending inwardly from the side of the housing 1, there is provided a pair of inwardly projecting side cartridge guides 10 and 11. Similarly, extending inwardly from the top of the frame 2 there is provided a plurality of cartridge guides 12, 13 and 14. Guides 10–14 are provided for positioning a tape cartridge in the drive 1.

Visible through a hole in the top of the frame 2 there is shown a drive pulley 17. As will be described below with respect to FIG. 2, pulley 17 is driven by a head stepper motor 47. Pulley 17 is coupled to a pulley 18 in a head tower assembly designated generally as 19, by means of a timing belt 20. To the left of the head tower assembly 19 there is provided a tape drive pulley 21. The pulley 21 is coupled to a tape drive capstan 22 by means of a flat belt 23. Adjacent to the belt 23 there is provided in accordance with the present invention a sensor bracket assembly 24. To the right of the capstan 22 and forming a part of the head tower assembly 19, there is provided a tape load lever 25. To the rear of the frame 2 there is provided a plurality of slots 26. Slots 26 are provided for receiving and supporting printed circuit boards in the tape drive 1. To the left of the slots 26 there is provided a pair of clearance holes 27 and 28. As will be further described below, holes 27 and 28 provide clearance for a pair of upstanding members 60 and 61 on a side pusher used for positioning a cartridge in the drive.

Figure 2:
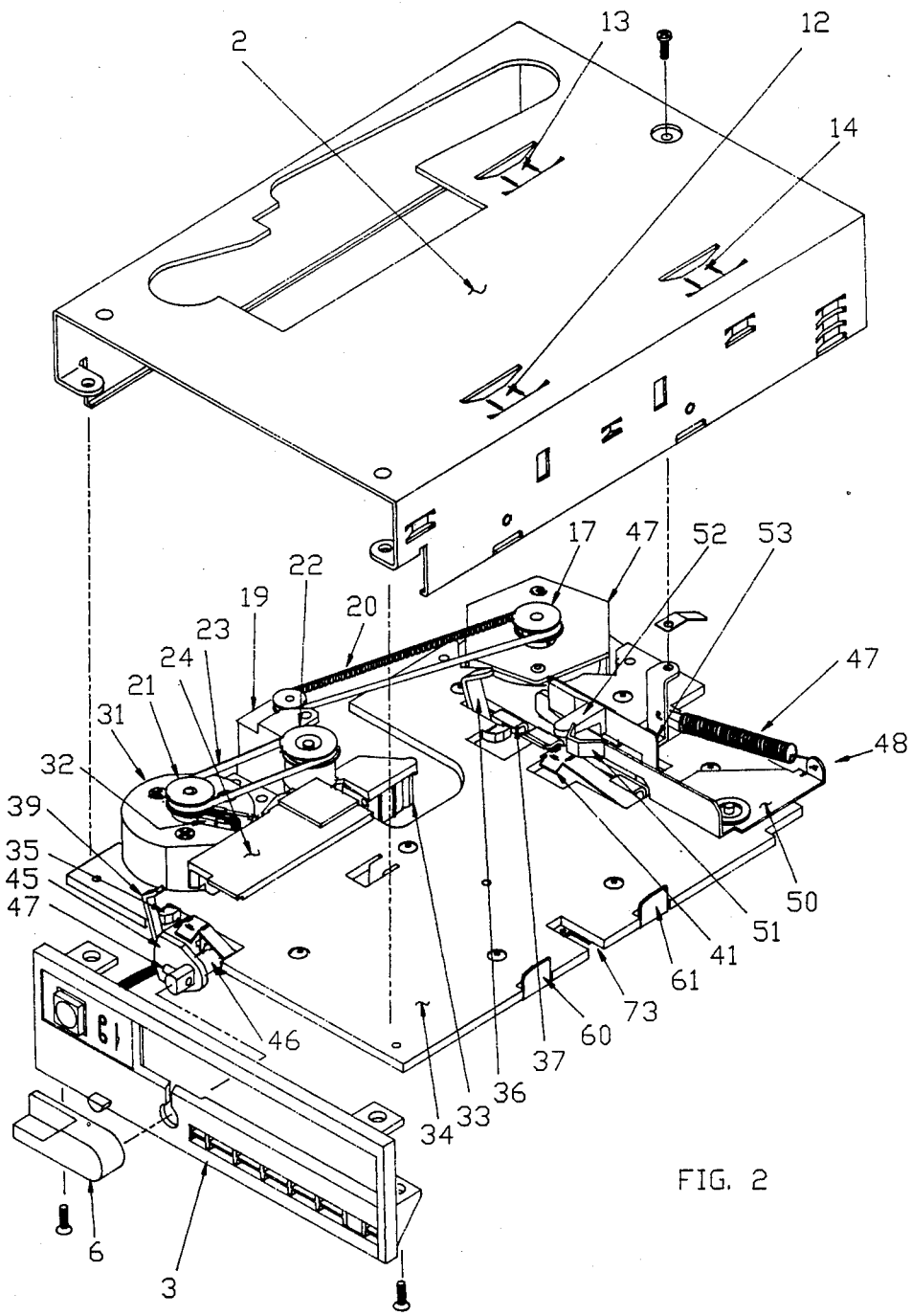
FIG. 2 is an exploded perspective top view of the drive of FIG. 1.

Referring to FIG. 2, mounted behind the panel 3 within the frame 2 there is provided a cartridge receiving and motor assembly 30. In the assembly 30 there is provided a tape capstan drive motor 31. Motor 31 has a nominal speed of 3600 rpm for driving the tape in the cartridge at a rate of 72 inches per second during reading and writing operations and at 90 inches per second during fast forward and fast reverse, rewind and erase operations. To the right of the pulley 21 and located therebeneath there is provided a motor speed sensor 32. Sensor 32 senses the speed of the motor 31 by detecting markings on the undersurface of the pulley 21. To the right of the assembly 24 and located beneath the tape load lever 25, there is provided in the head tower assembly 19 a magnetic tape read/write head 33.

Forming a part of a tape cartridge supporting plate 34 in the assembly 30, there is provided a pair of horizontal datums 35 and 36. Datum 35 is located at the front end of the plate 34 and datum 36 is located at the rear of the plate 34. Datums 35 and 36 are provided for engaging a plate on the bottom of the cartridge providing two fixed registration points and restraining horizontal movement of the tape cartridge in the drive. At the rear of the plate 34 there is provided another pair of datums 37 and 38.

Datums 37 and 38 are a pair of spaced L-shaped members which overlap the edge of the plate on the cartridge for providing two fixed registration points and preventing vertical movement of the rear of the cartridge within the drive 1.

At the front of the plate 34 to the left of the datum 35, there is provided a movable L-shaped datum 39. Datum 39 is movable from a retracted position as shown in FIG. 2 to a position in which the L-shaped portion overhangs an edge of the plate on the bottom of the tape cartridge for providing a third registration point and preventing vertical movement of the front of the tape cartridge in the drive. To the right of the datum 39 there is provided a front cartridge lift spring 40. At the rear of the plate 34 between the datums 37 and 38 there is provided a rear cartridge lift spring 41. Springs 40 and 41 engage the plate at the bottom of the cartridge for holding the cartridge firmly against the datums 37, 38 and 39.

To the right of the datum 39 and below the lift spring 40 there is provided a cartridge retainer 45. Retainer 45 is mounted to a cam shaft 46 for engaging a forward edge of the plate on the bottom of the cartridge. The retainer 45 provides a final registration point preventing axial movement of the tape cartridge within the drive. The end of the cam shaft 46 exterior of the retainer 45 is provided with a pin 47 which is received in a slot provided therefor in the lever 6.

Located at the rear of the assembly 30 there is provided for driving the pulley 17 a stepper motor 47. Stepper motor 47 rotates pulley 17 at the rate of 7½° per step to move the head 33 from track to track and to load and unload the head against and from the magnetic tape in the cartridge, as will be described further below. Pivotally mounted to the plate 34 at the rear of the assembly 30 there is provided an ejector assembly 48. In the assembly 48 there is provided an ejector spring 49. Spring 49 is connected to an L-shaped lever 50. The left end of the lever 50 is provided with a forwardly projecting extension 51 for engaging the rear of a tape cartridge inserted in the drive 1. The assembly 48 holds the tape cartridge firmly against the forward retainer 45 and ejects the cartridge when the retainer 45 is rotated out of the way, as will be further described below.

Located to the left of the extension 51 and extending toward the front of the drive 1, there is provided a cartridge trigger member 52. Member 52 is mounted on a spring 53. Engaged by the end of the spring 53 to the left of the member 52 there is provided an extended rear cam shaft rotation control member 54. As will be described further below, when a cartridge is inserted in the drive 1 and contacts the member 52, the member 52 is moved rearwardly against the force of the spring 53 and the ejector spring 48. When the end of the spring 53 clears the member 54, the member 54, which is fixedly attached to the cam shaft 46, is free to rotate clockwise, rotating the cam shaft 46 locking the cartridge in the drive 1.

To the left of the member 54 and the datum 36, there is provided a movable L-shaped door opener 55. As will also be further described below, when the member 54 is freed to rotate counterclockwise, the door opener 55 is also moved clockwise such that the horizontal leg of the L-shaped end thereof engages a movable door in the tape cartridge, opening the door in preparation for loading of the tape head against the tape inside the cartridge.

Figure 3:
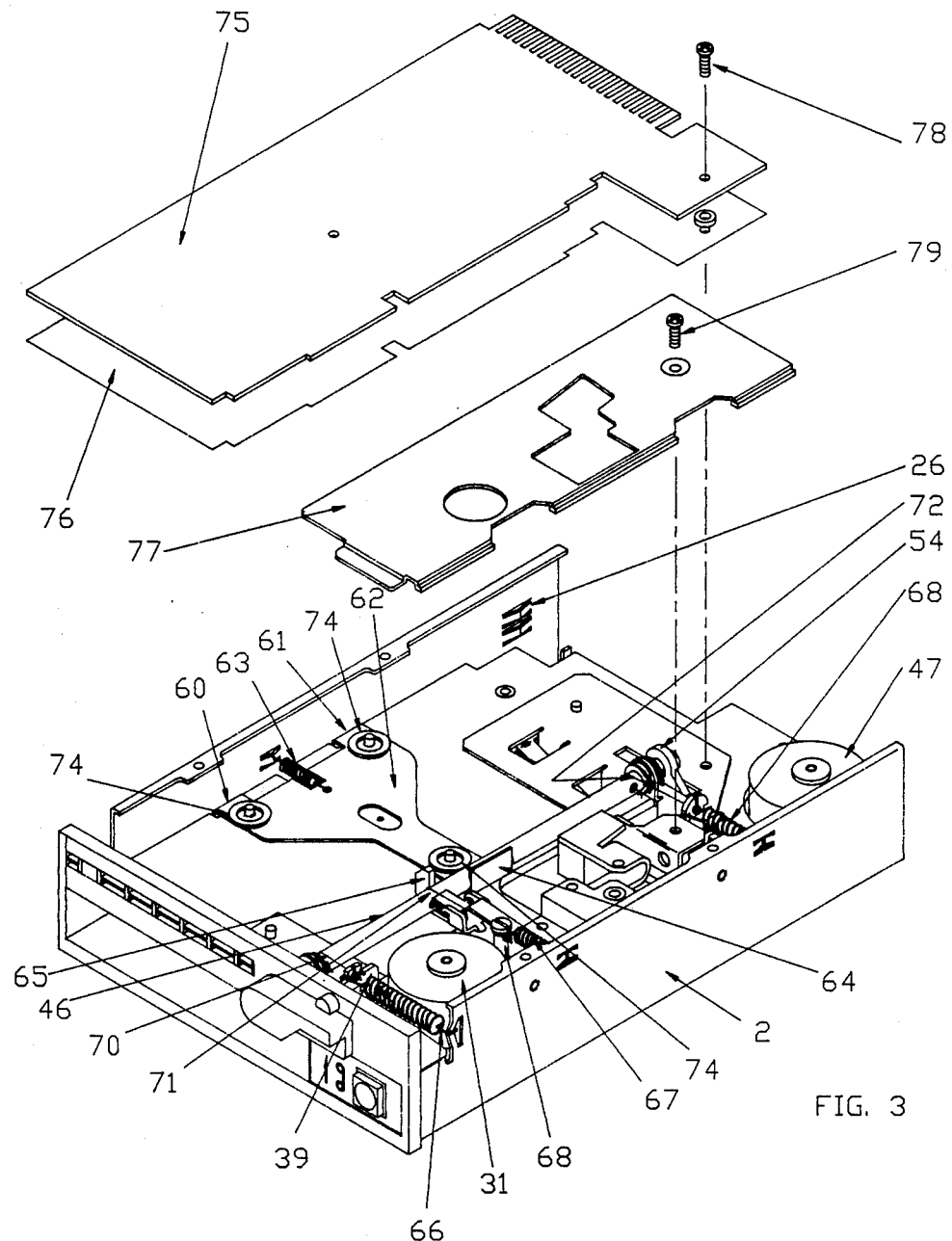
FIG. 3 is a partial exploded perspective view of parts of FIG. 2.

Referring to FIG. 3, there is provided in the sensor bracket assembly 24 an L-shaped mounting bracket 105. Bracket 105 is provided for mounting the assembly 24 to the plate 34 by means of a screw 106.

To the right of the assembly 24, the capstan pulley 22 is mounted to one end of a pivot arm 107. The opposite end of the pivot arm 107 comprises the post 68. The pivot arm 107 is mounted on a post 108 which extends vertically from the plate 34 in such a manner as to permit rotation of the arm 107 about the axis of the post 108.

Figure 4:
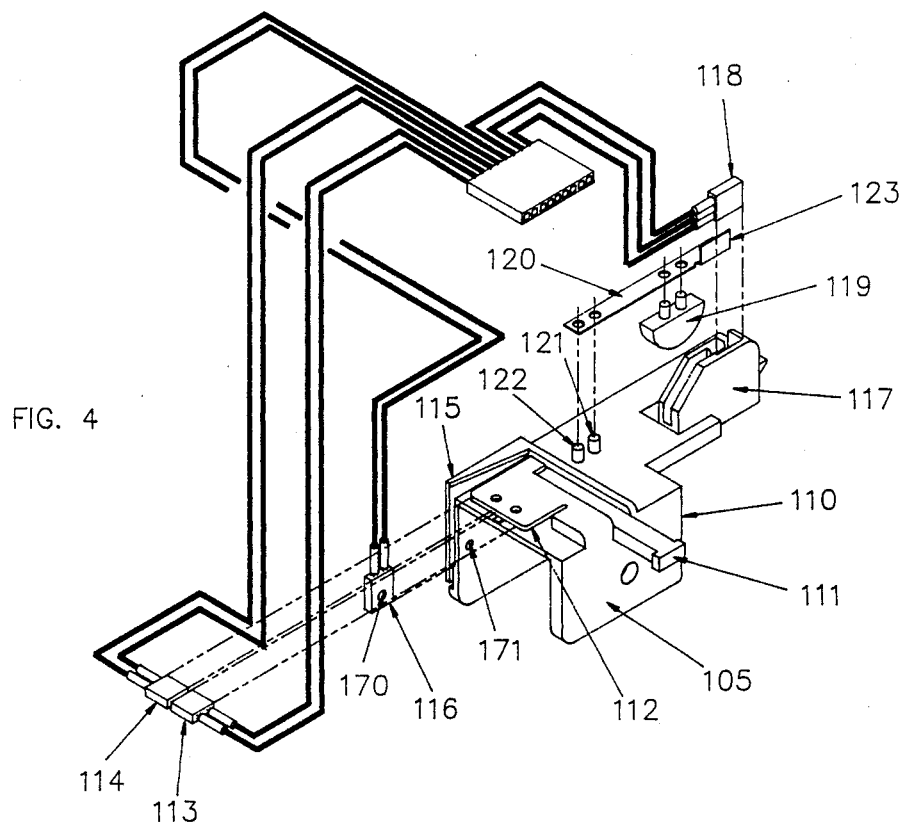
FIG. 4 is an exploded perspective view of the sensor bracket of FIG. 3.
Figure 5:
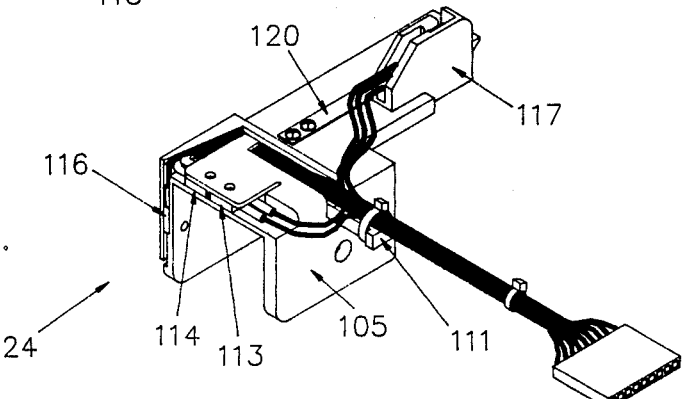
FIG. 5 is a perspective view of the bracket of FIG. 4 after it has been assembled.

Referring to FIGS. 4 and 5, there is further provided in the sensor bracket assembly 24 a U-shaped body member 110. The lower leg of the member 110 forms the mounting bracket 105. Extending downward from the center of the member 110 there is provided a cable harness post 111. On the center leg of the body member 110 there is provided a resilient sensor retaining member 112 for resiliently retaining a pair of sensors 113 and 114. Sensors 113 and 114 are typically photocells. On the upper leg of the bracket 110 there is provided another resilient retaining member 115 for resiliently clamping a light emitting diode 116. On the diode 116 there is provided a spherically shaped raised portion or bump 170. Bump 170 is provided for snapping into a hole 171 provided therefor in the upper leg of the bracket 110. At the opposite end of the bracket 110 there is provided still another resilient retaining member 117 for resiliently retaining still another combined light emitting diode and photocell 118. Sensor 113 is a bottom hole sensor for sensing the presence of a hole in the lower half of the magnetic tape in the tape cartridge. Sensor 114 is a top hole sensor for sensing a hole located in the top half of the tape in the tape cartridge. Sensor 118 is provided for write protection. Diode 116 provides the light by means of a mirror for sensors 113 and 114. Each of the retaining members 112, 115 and 117 extend from the U-shaped bracket 110 in a cantilever fashion and thus provide the resiliency necessary for clamping the sensors therein. Each of the sensor lenses is provided with detents which snap into holes provided in the bracket 110 as described above with respect to bump 170 and hole 171.

Associated with the write protect sensor 118 there is provided a write protect switch plunger 119 which is mounted to the end of a cantilevered spring member 120. One end of the spring member 120 is mounted on a pair of posts 121 and 122. Mounted at the opposite end of the spring member 120 there is provided a reflective surface 123.

As is well known, tape cartridges are typically provided with write protection in the form of a cavity which can be left open or closed. When the cavity is closed the switch plunger 19 is raised against the force of the spring 120. Under these conditions, light from the light emitting diode in the sensor 118 is reflected by the reflective surface 123 to and sensed by the sensor 118 and enables the write circuitry in the drive 1. On the other hand, if the write protect cavity in the tape cartridge is open, the plunger 119 is permitted to enter the cavity under the force of the spring 120 and light from the transmitting portion of the sensor 118 does not strike the reflective surface 123 and therefore is not detected by the sensor 118, thereby inhibiting the write circuits in the drive 1.

While a preferred embodiment of the present invention is described above, it is contemplated that various modifications may be made thereto without departing from the spirit and scope of the present invention. Accordingly, it is intended that the embodiment described be considered only as an illustration of the present invention and that the scope thereof should not be limited thereto but be determined by reference to the claims hereinafter provided.

What is claimed is:

1. A sensor bracket for a magnetic tape cartridge drive comprising:

a U-shaped bracket;

first means located on said bracket for resiliently retaining means for sensing holes located in a tape in a tape cartridge inserted in said drive;

second means located on said bracket for resiliently retaining means for sensing the condition of a write protect means located in said cartridge; and third means located on said bracket in a plane orthogonal to said first means for resiliently retaining a light source for operating said first means.

2. A bracket according to claim 1 wherein said first, second and third means each comprise a cantilevered member which is flexibly attached at one edge to said bracket.

3. A bracket according to claim 1 wherein said first means comprises a pair of photocells and said second means comprises a light source, a photocell and a movable reflective surface which is movable into and out of a path of light from said source for selectively reflecting light from said source to said photocell depending on said condition of said write protect means.

* * * * *